May 15, 1951          J. K. DIXON          2,553,404
PREPARATION OF ARALKYL CYANIDES
Filed April 8, 1950
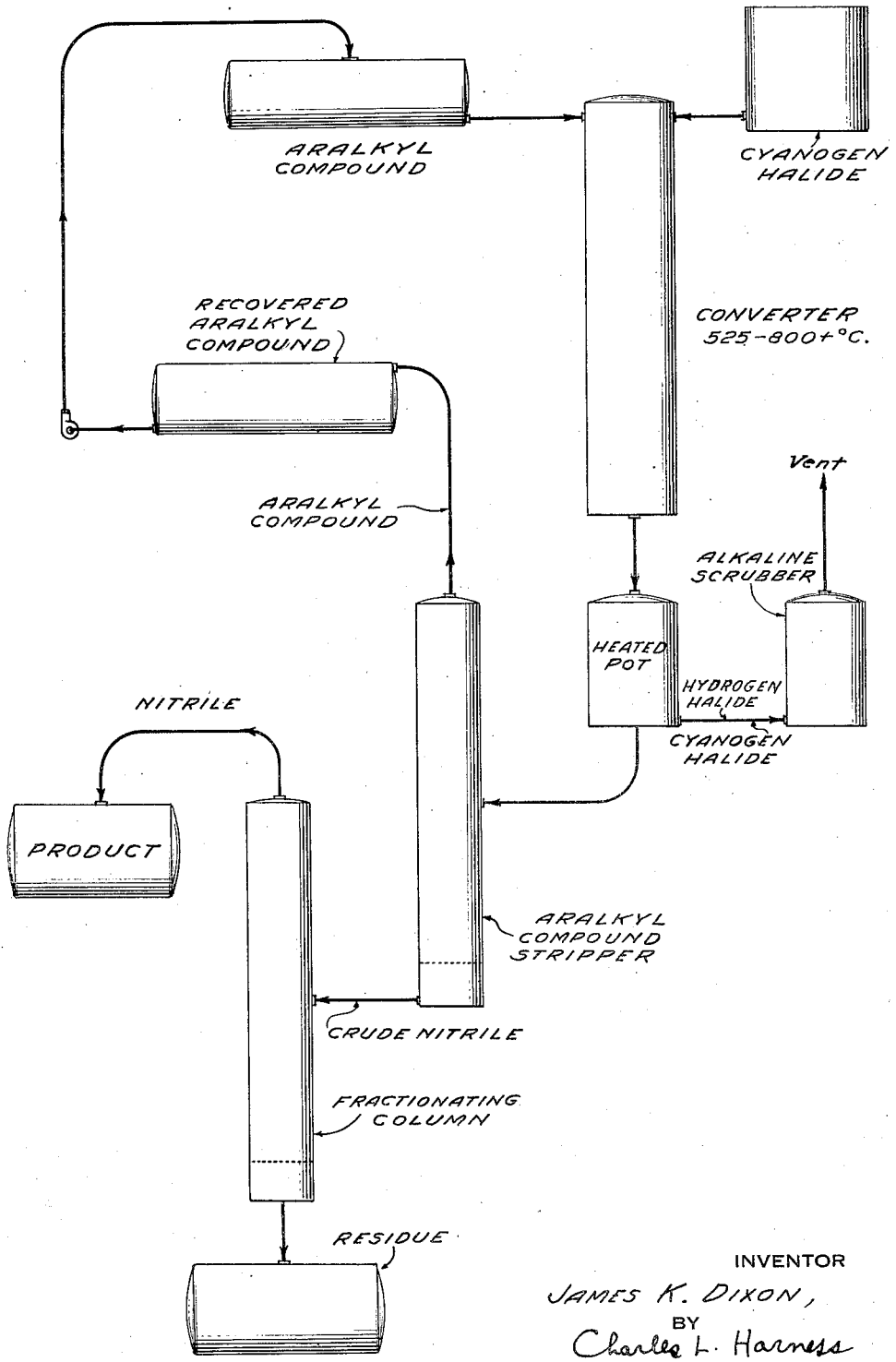
INVENTOR
JAMES K. DIXON,
BY
Charles L. Harness
ATTORNEY Patented May 15, 1951

2,553,404

UNITED STATES PATENT OFFICE 2,553,404

PREPARATION OF ARALKYL CYANIDES

James K. Dixon, Riverside, Conn., assignor to American Cyanamid Company, New York, N. Y., a corporation of Maine Application April 8, 1950, Serial No. 154,868

8 Claims. (Cl. 260—465)

The present invention relates to the preparation of aralkyl nitriles, including halo-aralkyl nitriles.

It is an object of the invention to react a cyanogen halide, such as cyanogen chloride or cyanogen bromide, with an aromatic hydrocarbon (which may be halogenated on the ring), such as toluene, methyl naphthalene, o-bromotoluene, chlorobenzene, and other members of the benzene series carrying an alkyl side chain, to prepare an aralkyl mononitrile. It is a further object to react alkyl aromatic compounds with a cyanogen halide in a hot tube. Additional objects will be apparent from the discussion hereinafter.

The high efficiency of the process as a means of placing a cyano group on the side chain of an aromatic compound is surprising, since in the analogous reaction of benzene with (for example) cyanogen chloride, the cyano group goes on the nucleus to form benzonitrile.

The reaction is preferably carried out at an average reaction tube temperature of at least 525° C.; and still more preferably, at an average temperature within the range 625°–700° C. Temperatures as high as 800° C. or even higher may be used, but the yields are greatly reduced. In most cases optimum yields will be obtained at an average temperature of about 650° C.

The vaporized reactants should be forced through the hot reaction tube at a velocity sufficiently slow to permit reaction, but not so slowly that the materials have an opportunity to decompose. A residence time of at least about ½ second at reaction temperature will be found necessary in most cases. On the average, a reaction time of 5–15 seconds is preferred.

The ratio of reactants is not critical, and some nitrile will be found even though the mol ratio varies from 0.1 to 10, or even more widely; however, as the cyanogen halide is generally more expensive than the hydrocarbon, it will be found economically preferable to use the hydrocarbon in molar excess.

The reaction is preferably conducted at atmospheric pressure, but superatmospheric pressures may be used if desired.

The following examples illustrate without limiting the invention.

*Example 1*

Toluene vapor (3.95 mols) and cyanogen chloride vapor (1.24 mols) were passed into a Pyrex tube heated in an electric furnace. The reaction tube was maintained at an average temperature of 672° C., and the contact time was 6 seconds. The resulting vapor mixture was condensed in a receiver maintained at a temperature of 120° C., which was sufficiently hot to condense toluene and phenylacetonitrile, while keeping by-product hydrogen chloride and unreacted cyanogen chloride in the vapor phase. The latter gases were drawn off from the top of the receiver through an alkaline trap which was vented to the atmosphere. In this reaction 1.06 mols of hydrogen chloride was absorbed in the trap. As shown in the accompanying flow sheet, Fig. 1, the crude phenylacetonitrile, together with unreacted toluene was passed into a fractionating column, where the toluene was stripped out and recovered for recycling, and the crude phenylacetonitrile was taken off at the bottom of the column for refractionation. In this experiment 0.87 mol of phenylacetonitrile was recovered, equal to a 70% conversion of the cyanogen chloride to the desired product.

Several modifications will be immediately apparent to one skilled in the art. It will not be necessary to use a tube of Pyrex, but any reaction tube resistant to the relatively high temperatures of the reaction will be suitable, including nickel, quartz, the alloy known as Inconel, and the like. Furthermore, instead of using a hot receiver to keep hydrogen chloride and cyanogen chloride in the vapor phase, if desired, all of the gaseous products may be condensed, followed by distillation to recover the nitrile product, or if desired, the reaction liquor can be washed in alkali to remove dissolved hydrogen chloride and cyanogen chloride, followed by fractionation to recover the unreacted hydrocarbon and the nitrile product.

*Example 2*

Using apparatus and procedure analogous to that of Example 1, 2.6 mols of m-xylene vapor and 1.06 mols of cyanogen chloride vapor were passed through a reaction tube at an average temperature of 662° C. for a contact time of 8 seconds. One mol of hydrogen chloride was found to be absorbed in the alkaline trap, and 1.61 mols of m-xylene was recovered unreacted. The recovery of m-methylphenylacetonitrile was 0.79 mol, indicating a 74.5% conversion of cyanogen chloride to this nitrile.

*Example 3*

Using the same procedure of the preceding examples, 1.46 mols of ethylbenzene was heated with 0.72 mol of cyanogen chloride in the vapor phase in a reaction tube maintained at an average temperature of 660° C., for a contact time of 7.5 seconds. By-product hydrogen chloride was measured at 0.5 mol, and 0.23 mol of phenylacetonitrile was recovered, equal to a 32% conversion of cyanogen chloride to this nitrile. Unreacted hydrocarbon recovered amounted to 0.22 mol.

*Example 4*

Using a procedure analogous to that of the preceding examples, 1.19 mols of α-methyl naphthalene was reacted with 0.50 mol of cyanogen chloride in the vapor phase in a hot tube maintained at an average temperature of 653° C. for a contact time of 8 seconds. The yield of 1-naphthalene acetonitrile was 0.21 mol, equal to a 52% conversation of the cyanogen chloride used.

*Example 5*

Using a procedure analogous to that of the preceding examples, 1.49 mols of cumene was heated with 0.66 mol of cyanogen chloride in the vapor phase in a reaction tube maintained at an average temperature of 644° C. for a contact time of 7 seconds. By-product hydrogen chloride amounted to 0.40 mol, and 0.09 mol of unreacted hydrocarbon was recovered. A mixture of nitriles, principally the dimethylphenylacetonitrile, was obtained. The conversion of input cyanogen chloride to the mixture of nitriles amounted to 34%.

*Example 6*

Using a procedure analogous to that of the preceding examples, 1.06 mols of diphenylmethane was heated with 0.37 mol of cyanogen chloride in the vapor phase in a reaction tube maintained at 633° C. average temperature for a contact time of 7 seconds. By-product hydrogen chloride amounted to 0.32 mol and 0.68 mol of unreacted diphenylmethane was recovered. The yield of diphenylacetonitrile was 0.22 mol, amounting to a 59.5% conversion of the input cyanogen chloride.

*Example 7*

Using a procedure analogous to that of the preceding examples, 2.32 mols of toluene was reacted with 1.41 mols of cyanogen chloride in a quartz reaction tube maintained at an average temperature of 744° C. for a contact time of 6 seconds. Conversion of cyanogen chloride to phenylacetonitrile was 42%.

*Example 8*

Using a procedure analogous to that of the preceding examples, 1.5 mols of o-bromotoluene was reacted with 0.57 mol of cyanogen chloride in the vapor phase in a tube maintained at an average temperature of 660° C. for a contact time of 6.5 seconds. The yield of o-bromophenylacetonitrile was 0.18 mol, amounting to 36% conversion of cyanogen chloride.

While the above examples all used cyanogen chloride, cyanogen bromide can be used equally well.

While the invention has been described with particular reference to specific embodiments, it is to be understood that it is not to be limited thereto but is to be construed broadly and restricted solely by the scope of the appended claims.

I claim:

1. The method of preparing a nitrile that comprises heating a member of the group consisting of alkyl aromatic hydrocarbons and ring halogen derivatives thereof with a cyanogen halide of the group consisting of cyanogen chloride and cyanogen bromide at a temperature of at least about 525° C. and recovering the thus-formed nitrile.

2. The method according to claim 1 in which the reaction is carried out at a temperature within the range 625°–700° C.

3. The method according to claim 2 in which the cyanogen chloride is in a stoichiometric deficiency.

4. The method of preparing phenylacetonitrile that comprises heating toluene and cyanogen chloride in the vapor phase at a temperature of at least 525° C. and recovering phenylacetonitrile from the resulting reaction mass.

5. The method of preparing m-methylphenylacetonitrile that comprises heating m-xylene and cyanogen chloride in the vapor phase at a temperature of at least 525° C.

6. The method of preparing phenylacetonitrile that comprises heating ethylbenzene and cyanogen chloride in the vapor phase at a temperature of at least 525° C.

7. The method of preparing 1-naphthalene acetonitrile that comprises heating α-methyl naphthalene and cyanogen chloride in the vapor phase at a temperature of at least 525° C.

8. The method of preparing diphenylacetonitrile that comprises heating diphenylmethane and cyanogen chloride in the vapor phase at a temperature of at least 525° C.

JAMES K. DIXON.

REFERENCES CITED

The following references are of record in the file of this patent:

UNITED STATES PATENTS

| Number | Name | Date |
|---|---|---|
| 2,449,643 | Cosby | Sept. 21, 1948 |

OTHER REFERENCES

Merz et al., Ber. Deut. Chem., vol. 10, p. 756 (1877).

Thompson, Chem. Abstracts, vol. 35, p. 7270 (1941).